March 15, 1932.    R. B. DALE    1,849,347
EXTERNAL COMBUSTION ENGINE
Filed June 8, 1928    2 Sheets-Sheet 1
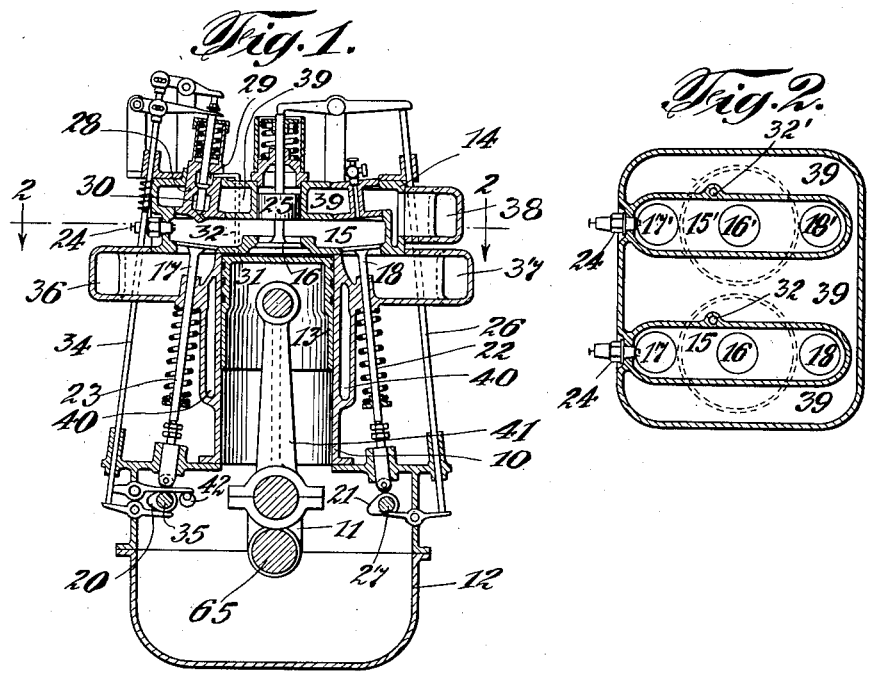
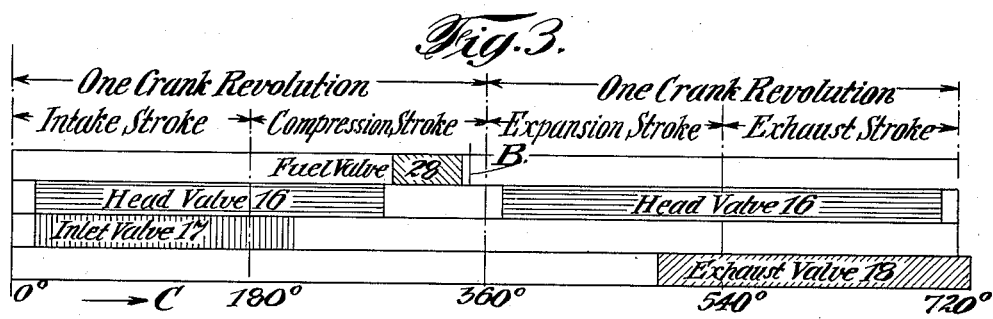
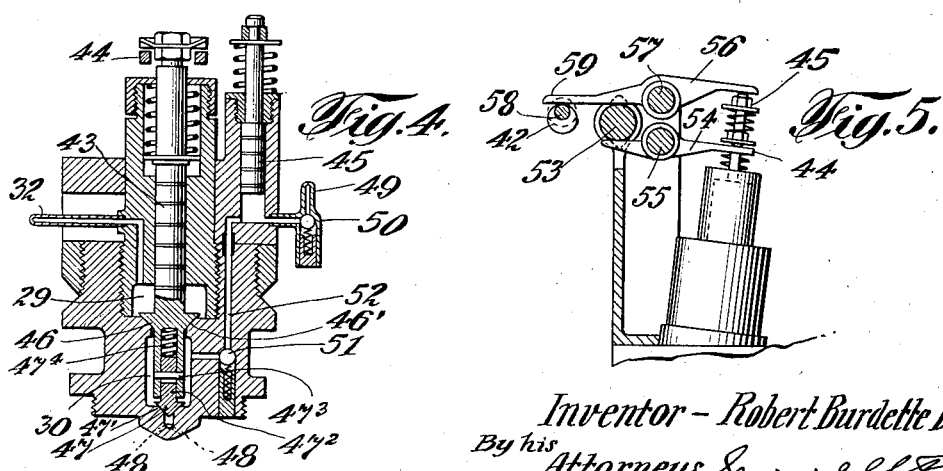
Inventor — Robert Burdette Dale
By his Attorneys

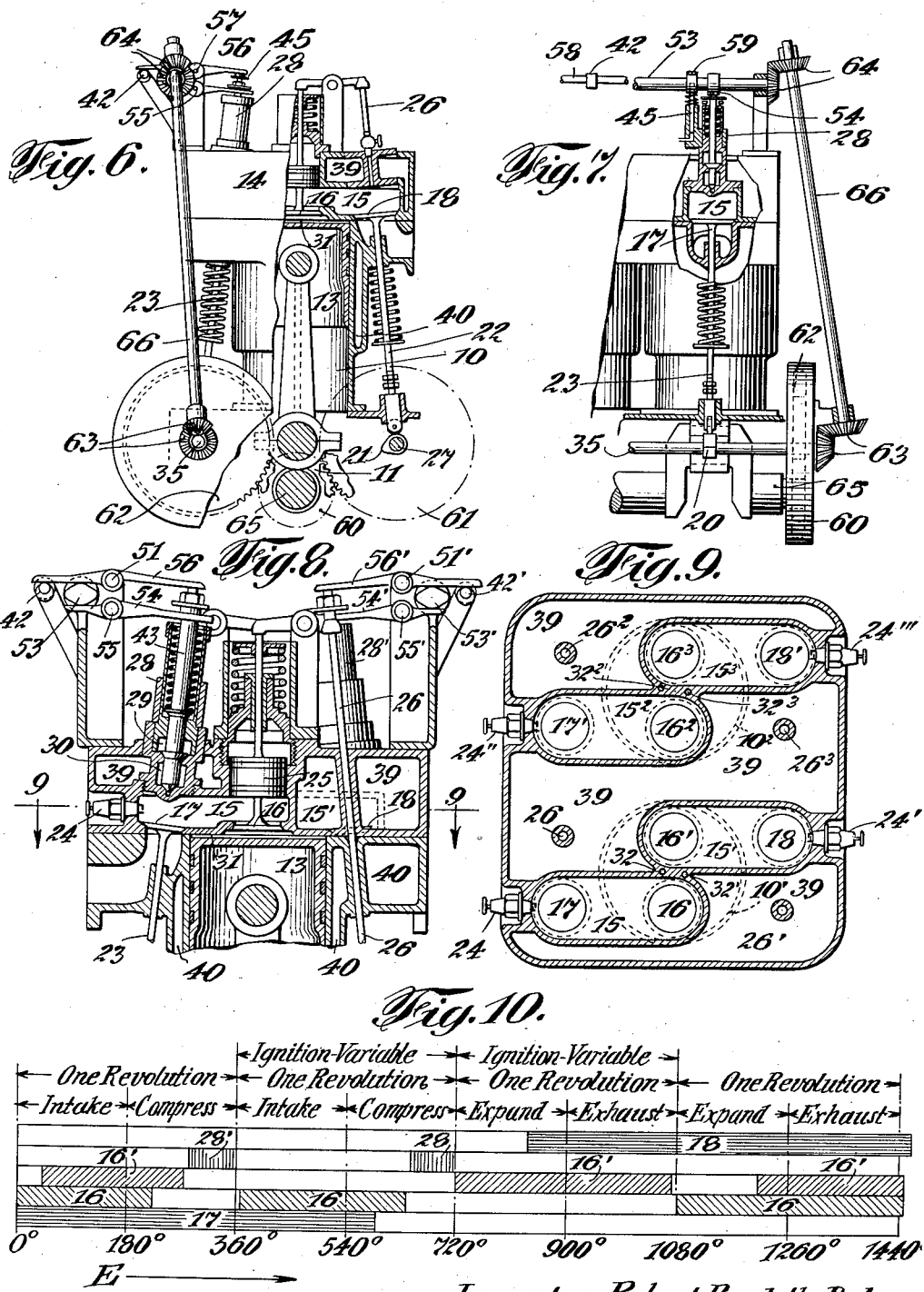

Patented Mar. 15, 1932

1,849,347

UNITED STATES PATENT OFFICE

ROBERT BURDETTE DALE, OF JAMAICA, NEW YORK, ASSIGNOR OF ONE-HALF TO SAMUEL SUMMER AND ONE-HALF TO FRANK S. SUMMER, BOTH OF NEW YORK, N. Y.

EXTERNAL COMBUSTION ENGINE

Application filed June 8, 1928. Serial No. 283,747.

This invention relates to an improvement in external combustion engines operating on fuel oil and having one or more combustion chambers for each operating cylinder and when constructed to include a plurality of combustion chambers for each cylinder it relates particularly to the type of engine, for example, as shown and described in Letters Patent No. 1,622,010 granted March 22nd, 1927, but is not limited thereto. Further, my invention also relates particularly to the means and method of introducing or injecting the fuel oil into the combustion chamber, atomizing it, and producing turbulence therein, under compression, in preparation for igniting the fuel either by means of the heat of compression, as in a Diesel engine, or by means of a hot bulb, as in a semi-Diesel engine, or by means of an electric spark, or otherwise.

One of the objects of my invention is to provide a means of spraying or atomizing fuel oil into the combustion chamber by compressed air without using a separate air compressor as usually employed. Separate compressors are generally of the three-stage type with intercoolers between each stage and with an after-cooler. Hence, when the fuel is sprayed into the cylinder, the air stream absorbs heat in expanding through the orifice of the spray nozzle, thus reducing the temperature of the charge much to the detriment of the efficient operation of the engine. A very important object of this invention is to preheat the injection air by adiabatic compression and to use this preheated air for spraying the fuel into the combustion chamber, resulting in increased thermal efficiency of the engine and improved conditions for combustion. A further object of this invention is to simplify the process of atomizing fuel oil and injecting it by a preheated air stream into the combustion chamber, and to reduce the number of moving and stationary parts required to accomplish this purpose by the elimination of a separate air compressor or other similar apparatus and, at the same time, to improve upon the advantages of air spray injection.

Various other objects and advantages of the invention will be specifically pointed out or made apparent hereinafter, in the course of the descriptions of preferred forms of possible constructions for carrying out the invention as applied, both to an external combustion engine provided with one external combustion chamber for each operating cylinder and, also to an external combustion engine of the type described in Patent No. 1,622,010, provided with a plurality of external combustion chambers for each operating cylinder; it being understood, of course, that the constructions hereinafter described are merely illustrative of specific combinations and arrangements of parts calculated to attain the objects of the invention, pursuant to present preference, and hence are not to be construed as completely defining or limiting the invention itself.

In the accompanying drawings Figure 1 is a central longitudinal section through the cylinder, external combustion chamber and fuel valve of a type of engine having a single external combustion chamber for each operating cylinder, Fig. 2 is a transverse section on line 2—2, Fig. 1 through the cylinder head and combustion chamber, for two cylinders cast en bloc, Fig. 3 is a valve diagram showing the sequence of operation of the valves for 720 degrees of rotation of the crank for a four-stroke cycle engine, Fig. 4 is a section through the fuel metering, mixing and injecting device, Fig. 5 is a section and partial elevation showing another method of operating the metering pump and fuel injecting valve, Fig. 6 is a partial section through the cylinder and combustion chamber and shows a method of driving an overhead cam shaft for the operation of the fuel valve and metering pump, Fig. 7 is a partial longitudinal section taken at right angles to the position of the parts shown in Fig. 6, Fig. 8 is a central longitudinal section through a cylinder which is provided with two external combustion chambers for each cylinder, Fig. 9 is a transverse section on line 9—9 of Fig. 8 through the cylinder head and combustion chambers for the cylinder illustrated in Fig. 8, and for two cylinders cast en bloc, and Fig. 10 is a valve diagram showing the sequence of operation of the valves for one cylinder with two external combustion chambers, for 1440 degrees of rotation of the crank for an eight-stroke cycle engine.

Referring to Fig. 1, 10 represents the operating cylinder, 11 the crank, 12 the crank case, 13 the piston, 14 the cylinder head containing the external combustion chamber 15, and 16 the communicating valve between the combustion chamber 15 and the cylinder 10. An intake valve for the admission of incoming air is shown at 17 and an exhaust valve for the emission of the spent products of combustion is shown at 18.

The intake valve 17 is operated by means of a rod 23 and a cam 20. Similarly, the exhaust valve 18 is operated by a rod 22 and a cam 21. The spark plug is shown at 24. The balance and guide piston 25 for valve 16 is actuated by a rod 26, which is operated by a cam (not shown in this view) on cam shaft 27. The fuel valve is indicated at 28, 29 being the air pressure chamber connected with the clearance space 31 in the upper portion of the cylinder, by conduit 32. The oil chamber 30 of fuel valve is more fully described in connection with Fig. 4. The fuel valve 28 is actuated by the rod 34, which is operated by a cam (not shown in this view) on cam shaft 35. The air intake manifold is shown at 36 and the exhaust manifold at 37. The water discharge manifold is shown at 38 but the water intake manifold is not shown in this view. The water cooling space in the head is indicated at 39 and the cooling space in the cylinder jacket is shown at 40. The connecting rod is shown at 41. At 42 is shown a hand operated eccentric to limit the stroke of the metering pump, the operating cam for which is not shown in this view.

In Fig. 2 there are shown in section the conduits 32 and 32' connecting the spaces in the upper portion of the cylinders with the air pressure chambers 29 of the fuel valves. The location of valves 17, 17' and 18, 18' and the conduits 32, 32', as illustrated, is intended to show one preferred location only, as the valves may be located in any suitable positions.

A valve diagram laid out on a rectified crank circle for two revolutions of the crank is shown in Fig. 3. The hatched portions of the rectangles represent the approximate period during which the respective valves are open. The arrow C indicates the direction in which the diagram is to be read. Considering two revolutions of the crank, the intake stroke begins by simultaneous opening of the valve 16, here called head valve 16 communicating between the operating cylinder and the external combustion chamber, and the inlet valve 17 about 5 degrees after top dead center piston position. Both these valves remain open for the ensuing down or intake stroke of the piston and for 180 degrees of crank rotation. During this stroke pure air is drawn into the cylinder space through valves 16 and 17. During the next or compression stroke the intake valve 17 closes after the crank has passed bottom dead center about 30 degrees. Head valve 16, however, remains open, thus permitting the piston to partially compress the entrapped air into the external combustion chamber 15. At a point approximately 100 degrees (more or less) after the piston has passed bottom dead center, valve 16 is closed by action of its cam. As the piston moves toward the top of the cylinder the entrapped air is further compressed and a pressure differential is built up between the air entrapped in the top of the cylinder and above the piston and the air which has been partially compressed into the combustion chamber 15. The fuel valve 28 is opened at this time as indicated in Fig. 3 and, since this valve is connected to the space 31 above the piston by means of the conduit 32, the fuel oil which has been metered into the oil chamber 30 of the fuel valve 28 is thereupon sprayed into the combustion chamber 15 by virtue of the pressure differential which has been built up and which continues to build up and increase at a rate dependent upon the resistance of the orifices of the spray nozzle and the rate at which the piston approaches the top of its stroke. At a point about 5 degrees ahead of the top of the stroke, the fuel valve 28 is closed by the action of its cam and ignition takes place at about the point indicated by B in the diagram of Fig. 3.

From the description just given and from the further descriptions of the fuel valve 28 to follow, it will be apparent that the air pressure required to spray the fuel oil into the combustion chamber is produced by the compression stroke of the piston, compressing pure air adiabatically and consequently doing work thereon and adding heat thereto. There being no intercoolers, as in the case of a separate compressor, and no necessity existing for the cooling of the compressed air which produces the spraying action required to atomize the fuel and inject it into the external combustion chamber 15, the thermal efficiency of the engine acting as a heat engine is increased and the process of combustion is improved.

As soon as the piston begins its downward or expansion stroke and about 5 degrees (more or less) after top dead center, the valve 16 is opened by the action of its cam, thus permitting the products of combustion to expand through the port of valve 16 against the piston and to do work thereon, thus producing power. At a point about 30 degrees ahead of bottom dead center, the exhaust valve 18 is opened by the action of its cam and the spent products of combustion pass through valve 16, which remains open and on the succeeding upward stroke of the piston are expelled through the exhaust valve 18 which closes at about 5 degrees (more or less) after top dead center. It is immaterial whether valve 16 be made to close at this point and open immediately thereafter, or whether it be arranged to remain open for the following intake stroke. After two revolutions or 720 degrees of crank rotation, the cycle is repeated.

The operation of the valves as described is not to be considered as limited by the stipulated proportions of the stroke as described, as it will be evident that the proper sequence of the events with relation to the crank positions is of more importance than the precise proportion of the stroke at which each valve event occurs.

Further, some slight modifications may, after experimental research, be found to be desirable, such as, for example, the opening of head valve 16, slightly prior to upper dead center position at 360 degrees of crank rotation, rather than slightly subsequent thereto as indicated in Fig. 3. The object of such modification being to equalize the pressure above the piston in space 31, Fig. 1 and in external combustion chamber 15, Fig. 1, before ignition takes place but after the fuel has been atomized through the spray valve. This modification is thought to be particularly desirable in the case of an engine operating on the Diesel principle where ignition is produced by the heat of compression, for the reason that the benefit of the maximum available compression pressure will be received by the charge in the combustion chamber, without being reduced by the resistance caused by the spray orifices.

The fuel injection valve and metering pump are shown in Fig. 4. The oil chamber or compartment in indicated at 30 and the air pressure chamber is shown at 29, as hereinbefore described. The air pressure chamber 29 is connected to the conduit 32 which leads to space 31 Fig. 1, as hereinbefore stated. The valve spindle 43 is operated by the rocker arm fork shown in section at 44. On valve spindle 43 are two valves 46 and 47 with seats 46' and 47' therefor in the casing of the fuel device. The valve 47 is as illustrated at the end of a plunger or stem 47$^2$ operating in a bore provided therefor in an extension of the valve spindle 43. These parts are so connected by a pin 47$^3$ as to permit a slight relative movement between them and the valve 47 and its stem 47$^2$ are actuated by a spring 47$^4$ extending between the inner end of the stem 47$^2$ and the base of the bore in which this valve stem operates in order to permit the valve 46 to be moved from its seat an appreciable distance before the movement of the valve spindle 43 lifts the valve 47 from its seat. Obviously this results in the return movement of the valve spindle 43 in the seating of the valve 47 slightly before the seating of the valve 46. The valve 46 when closed prevents compressed air from entering chamber 30 and when opened permits the air which has been compressed by the engine piston to pass through conduit 32 and enter chamber 30, where it comes in contact with the fuel oil which has been introduced therein by the action of the metering pump plunger 45.

The orifices through which the fuel is sprayed are shown at 48, 48. The conduit 49 is connected to the fuel supply tank or main fuel pump (not shown). Check valve 50 is arranged to admit the flow of fuel oil into the metering pump cylinder on the suction stroke of the pump plunger 45, but to prevent flow in the opposite direction on the pressure stroke of the pump plunger 45. Check valve 51 is arranged to close on the suction stroke of the pump plunger and to open on the pressure stroke, thus effecting the introduction of a charge of fuel oil into chamber 30 through conduit 52 when the pump plunger is actuated by its cam and rod. The stroke of the plunger is limited by the manually adjusted eccentric shown at 42, Fig. 1 and more clearly shown in an alternate application in Fig. 5, thus metering the charge of fuel. The cams are properly timed to actuate the pump plunger 45 and the valve spindle 43 at the correct proportion of the stroke to admit the fuel into the combustion chamber 15 at substantially the instant required as shown in the valve timing diagram, Fig. 3.

Fig. 5 illustrates an alternate method of operating the fuel valve and metering pump by means of a cam shaft 53 mounted overhead and actuated by two pairs of bevel gears as shown in Fig. 6. The rocker arm 54 fulcrumed at 55 is operated by a cam on cam shaft 53 to lift the spindle 43 by the rocker arm fork 44 and thus actuate the fuel valve and admit atomized oil fuel into the combustion chamber. The rocker arm 56 fulcrumed at 57 is operated by a cam on cam shaft 53 to depress the plunger 45 of the metering pump, thus, at the appropriate time, causing the pump plunger to deliver a metered charge of oil fuel to oil chamber 30, Fig. 4. By means of the eccentric shown at 42 the travel of the rocker arm 56 is limited and, therefore, the stroke of the pump plunger 45 is controlled. If, for example, a small charge of fuel oil is desired, the shaft 58 to which the eccentric 42 is attached is rotated 180 degrees so that the cam portion of the eccentric is at the top, the length of the return travel of plunger 45 is limited by the extension 59 of the rocker arm 56 coming in contact with the eccentric 42. Any desired intermediate length of stroke is obtained by an intermediate rotation of the eccentric shaft 58. It is understood that the rotation of eccentric shaft 58 may be effected in any manner known in the art.

In Fig. 6 are shown the timing gears 60, 61, 62, of which the pinion 60 is keyed to the main shaft 65 and the gear 61 meshing with pinion 60 drives the cam shaft 27. In like manner the gear 62 meshing with pinion 60 drives the cam shaft 35. Cam shaft 35 is extended as shown in Fig. 7 to drive a pair of bevel gears 63 and through a shaft 66 drive another pair of bevel gears 64 which in turn actuate cam shaft 53, Fig. 5 and Fig. 7. Reference characters in Fig. 7 refer to similar parts in Figs. 1, 5 and 6.

Fig. 8 is a section through a cylinder which is provided with two external combustion chambers 15 and 15' for each operating cylinder as more clearly shown in Fig. 9. The indices used on the characters in Figs. 8 and 9 indicate similar parts which are duplicated because of the fact that two external combustion chambers are provided in the manner and for the purpose more fully described and set forth in Patent No. 1,622,010, previously referred to. Thus in Fig. 8 15 refers to one external combustion chamber and 15' refers to another combustion chamber, both being connected to one operating cylinder 10' through two connecting or head valves 16 and 16', one for each combustion chamber. In a similar manner, Fig. 9 being a section taken on line 9—9, Fig. 8 for two cylinders cast en bloc, $15^2$ and $15^3$ are the external combustion chambers for the second cylinder $10^2$ provided with head valves $16^2$ and $16^3$.

In Fig. 8 two overhead cam shafts 53 and 53' are provided, the one 53 to operate the fuel valve 28 on the left side of the cylinder, and the other 53' to operate the fuel valve 28' on the right side of the cylinder. Cam shaft 53' is actuated by a set of two pairs of bevel gears and a shaft similar to those shown at 63, 64, and 66 in Fig. 7 but on the right side of the cylinder.

Fig. 10 is a valve diagram similar to Fig. 3 except that, in this case, the crank rotation is for four revolutions as would be required for one complete series of events, as more fully described in Patent No. 1,622,010. The hatched portions of the rectangles represent the approximate period during which the respective valves are open. The arrow E indicates the direction in which the diagram is to be read. The diagram is confined to the operation of one cylinder only.

The intake stroke for one cylinder begins with the simultaneous opening of the intake valve 17 and the head valve 16. Immediately thereafter head valve 16' is opened. The down stroke of the piston draws in a charge of fresh air through intake valve 17 and head valve 16 into the cylinder. On the return or compression stroke, head valve 16 is closed at about 20 degrees past bottom dead center, thus partially compressing the charge of fresh air into external combustion chamber 15'. At about one-half to two-thirds of the compression stroke head valve 16' is closed and further upward travel of the piston creates a differential pressure between the entrapped air above the piston in space 31 and that in the external combustion chamber 15', Fig. 9. As the piston moves toward the top of the cylinder the fuel valve 28' is opened and fuel oil is sprayed into chamber 15' as previously described, where it remains for the following complete revolution of the crank, thus effectuating the results claimed in Patent No. 1,622,010. Ignition may take place in combustion chamber 15' at any preferred time during this revolution of the crank as determined by operating conditions, and should be at the instant which will afford the most advantageous propagation of the flame and the most complete combustion and consequent most advantageous liberation of heat from the fuel. The time of ignition is varied by advancing or retarding the spark in the manner well known in the art.

About 5 degrees after top dead center, crank position, at the end of the first revolution head valve 16 is again opened and another charge of pure air is drawn into the cylinder through inlet valve 17 which remains open during the second intake stroke, as indicated in Fig. 10.

At about 40 degrees passed bottom dead center, or passed 540 degrees of crank rotation, inlet valve 17 is closed and compression takes place, partially compressing the charge of pure air into external combustion chamber 15, through head valve 16. At about one-half to two-thirds of the second compression stroke the head valve 16 is closed and upward travel of the piston creates a differential pressure between the entrapped air above the piston in space 31 and that in the external combustion chamber 15. As the piston moves toward the top of the cylinder, the fuel valve 28 is opened and fuel oil is sprayed into the chamber 15 in the manner previously described, where it remains and is ignited in the manner and for the purpose previously mentioned in connection with the functioning of chamber 15'.

At the beginning of the third revolution of the crank, indicated at 720 degrees, Fig. 10, head valve 16' is opened, thus permitting the products of combustion in chamber 15' to expand through the port of valve 16' against the piston and to do work thereon, thus producing power during the downward stroke of the piston. About 30 degrees ahead of bottom dead center exhaust valve 18 is opened and on the subsequent or exhaust stroke the spent products of combustion pass through port of valve 16' which remains open and are expelled through the port of exhaust valve 18. The head valve 16' is closed at about 10 degrees before top dead center of this stroke.

At the beginning of the next, or fourth revolution of the crank, indicated at 1080 degrees, Fig. 10, the head valve 16 opens, thus permitting the products of combustion which have been previously ignited in chamber 15, to expand through the port of valve 16 against the piston and to do work thereon. At about 30 degrees ahead of bottom dead center the head valve 16' is opened, exhaust valve 18 being open, and on the subsequent or exhaust stroke, the spent products of combustion pass through the port of valve 16' and the port of exhaust valve 18 to the exhaust manifold and thence to the atmosphere, thus completing the series of events for one cylinder over a period of four revolutions of the crank. The cycle is then repeated.

Previous remarks in reference to the operation of the valves in relation to the stipulated proportions of the stroke made in connection with Fig. 3 apply with equal force to the description here given in connection with Fig. 10.

It will be understood as hereinbefore stated, that the construction of the devices involving the present invention as hereinbefore illustrated and described are merely illustrative and that these may be varied to involve obvious equivalents thereof without departing from the nature and spirit of the invention.

I claim as my invention:

In an external combustion engine, a cylinder, a piston therein, a combustion chamber exterior of the cylinder, a head valve for controlling a passage between the combustion chamber and the cylinder, a fuel injecting device including a casing having a compressed air chamber therein, a fuel chamber therein, there being a passage making communication between the said compressed air chamber and the fuel chamber and also a passage making communication between the said fuel chamber and the combustion chamber, a valve for controlling the passage between the compressed air chamber and the fuel chamber, a valve for controlling the passage making communication between the fuel chamber and the combustion chamber, a stem on which the last aforesaid valve is carried, the said stem operating in a bore at the inner end of an extension of the valve for controlling the passage making communication between the compressed air chamber and the fuel chamber, a spring extending between the inner end of the said valve stem and the base of the said bore, means for limiting the extent of the movement of the said valve and its stem in said bore, a connection making communication between the said compressed air chamber and the interior of the cylinder, and means for operating the said valves whereby air compressed in the cylinder during a part of the compression stroke of the piston is trapped in the combustion chamber and air compressed during the remainder of the compression stroke of the piston is compressed in the compressed air chamber and is utilized to inject a charge of fuel from the fuel chamber to the combustion chamber.

Signed by me this 1st day of June, 1928.

ROBERT BURDETTE DALE.